(12) United States Patent
Ichieda

(10) Patent No.: US 8,384,660 B2
(45) Date of Patent: Feb. 26, 2013

(54) DISPLAY SYSTEM, DISPLAY DEVICE AND DISPLAY METHOD

(75) Inventor: Hiroyuki Ichieda, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 972 days.

(21) Appl. No.: 12/168,031

(22) Filed: Jul. 3, 2008

(65) Prior Publication Data
US 2009/0015515 A1    Jan. 15, 2009

(30) Foreign Application Priority Data
Jul. 13, 2007  (JP) .................................. 2007-184101

(51) Int. Cl.
G09G 5/00  (2006.01)
G09G 3/04  (2006.01)

(52) U.S. Cl. .......................................... 345/156; 345/33
(58) Field of Classification Search .......... 345/156–169, 345/33
See application file for complete search history.

(56) References Cited

U.S. PATENT DOCUMENTS

| 7,463,216 | B2 | 12/2008 | Yamazaki et al. | |
| 2004/0099741 | A1* | 5/2004 | Dorai et al. | 235/462.08 |
| 2007/0290499 | A1* | 12/2007 | Tame | 283/70 |
| 2008/0074560 | A1* | 3/2008 | Ichieda | 348/739 |
| 2008/0136918 | A1 | 6/2008 | Yamazaki et al. | |

FOREIGN PATENT DOCUMENTS

| EP | 1724754 A1 * | 11/2006 |
| JP | 2002-351763 | 12/2002 |
| JP | 2004-133354 | 4/2004 |
| JP | 2004-221908 A | 8/2004 |
| JP | 2007-148350 A | 6/2007 |
| JP | 2007-312179 | 11/2007 |
| JP | 2007312179 A * | 11/2007 |

* cited by examiner

*Primary Examiner* — Waseem Moorad
(74) *Attorney, Agent, or Firm* — AdvantEdge Law Group, LLC

(57) ABSTRACT

A display system displays a received image on a display device based on image information transmitted from at least one image supply device via a network. An image generating unit generates a segmented image segmented into plural individual areas, the segmented image contains an individual connection image representing connection information for the image supply device to connect to the display device in an area correlated to one individual area of the plural individual areas. A determining unit determines whether connection is permitted or not based on the connection request information. When connection to the image supply device is permitted by the determining unit, the image generating unit generates the segmented image containing the received image based on the image information from the image supply device in the individual area.

19 Claims, 8 Drawing Sheets

DISPLAY SYSTEM, DISPLAY DEVICE AND DISPLAY METHOD

CROSS REFERENCE TO RELATED APPLICATIONS

The present application claims priority and incorporates herein by reference in its entirety Japanese Patent Application No. 2007-184101 filed Jul. 13, 2007.

BACKGROUND

Recently, image display using image information supplied from an image supply device such as a PC (Personal Computer) to a display device such as a projector via a network has become more common. For example, Japanese Patent Publication No. JP-A-2004-133354 discloses a display device that segments an image into plural areas and displays images based on image information from plural terminals in the respective areas.

However, in the method shown in the Japanese Patent Publication No. JP-A-2004-133354, it is necessary to establish connection with respect to each terminal, and request for transmission and request for halt of transmission with respect to each terminal. Further, generally, when making a network connection, it is necessary to establish connection using identification information of password, ESSID (Extended Service Set Identifier), and the like for ensuring security. In this case, a user should input identification information, and such connection is not practical because a lot of time and effort is taken when an indefinite number of image supply devices are connected to a display device as in a presentation or conference.

As a method for solving the problems of limitation of connection and troubles in connection, for example, a conceivable method is to establish connection by reading a two-dimensional barcode indicating each terminal or the like with a pen scanner or CCD camera like the method shown in the Japanese Patent Publication No. JP-A-2002-351763. Further, with a combination of the method shown in the Japanese Patent Publication No. JP-A-2004-133354 and the method shown in the Japanese Patent Publication No. JP-A-2002-351763, a conceivable method is that each terminal takes an image of a two-dimensional barcode and connects to a display device, and the display device displays images based on image information from the respective terminals in individual areas assigned to the respective terminals within one image.

However, if the method is used, the individual areas are internally assigned by the display device and it is difficult for the user to know which terminal is assigned to which area. Further, if the method is used, it is also difficult for the user to display an image of a desired terminal in a desired area according to the status of use.

SUMMARY

A display system, a display device, and a display method by which, when at least one image supply device and a display device are connected and an image from the image supply device is displayed in one of plural areas within one image, connection may be easily made with ensured security and the area displaying the image is indicated.

A display system according to at least one embodiment is a display system including at least one image supply device and a display device that displays a received image based on image information transmitted from the at least one image supply device via a network. The display system includes: an image generating unit that generates a segmented image segmented into plural individual areas; a display unit that displays the segmented image; a receiving unit that receives the image information and connection request information from the image supply device; and a determining unit that determines whether connection is permitted or not based on the connection request information, and the segmented image contains an individual connection image representing connection information for the image supply device to connect to the display device in an area correlated to one individual area of the plural individual areas. The image supply device includes: an imaging unit that takes an image of an area including the area correlated to the individual area in the segmented image and generates imaging information; an information generating unit that generates the connection request information representing a connection request to the display device based on the connection information contained in the imaging information; and a transmitting unit that transmits the connection request information and the image information to the display device. When connection to the image supply device as a transmission source of the connection request information is permitted by the determining unit, the image generating unit generates the segmented image containing the received image based on the image information from the image supply device in the individual area.

Further, a display device according to at least one embodiment is a display device that displays a received image based on image information transmitted from at least one image supply device having a communication function and an imaging function via a network. The display device includes: an image generating unit that generates a segmented image segmented into plural individual areas; a display unit that displays the segmented image; a receiving unit that receives the image information and connection request information from the image supply device; and a determining unit that determines whether connection is permitted or not based on the connection request information. The segmented image contains in an area correlated to one individual area of the plural individual areas an individual connection image representing connection information for the image supply device to take an image of an area including the area correlated to the individual area in the segmented image. When connection to the image supply device as a transmission source of the connection request information is permitted by the determining unit, the image generating unit generates the segmented image containing the received image based on the image information from the image supply device in the individual area.

Further, a display method according to at least one embodiment is a display method using at least one image supply device that has a communication function and an imaging function, and a display device that has a communication function and an image display function and displays a received image based on image information transmitted from the at least one image supply device via a network. In the method, the display device displays the segmented image containing an individual connection image representing connection information for the image supply device to connect to the display device in an area correlated to one individual area of the plural individual areas contained in the segmented image; the image supply device takes an image of an area including the area correlated to the individual area, generates imaging information, generating connection request information representing a connection request toward the display device based on the connection information contained in the imaging information and transmits the connection request information to the display device; the display device receives the connection request information and establishes connection to the image supply device as a transmission source of the connection request information; the image supply device generates the image information; and the display device receives the image information and displays the segmented image containing the received image based on the image information in the individual area and segmented into plural individual areas.

According to various embodiments, the display system or the like may make connection with ease and ensured security by imaging the connection information to generate the connection request information and transmitting and receiving the connection request information. Further, according to at least one embodiment, the display system or the like may clearly present in which area the image is displayed by displaying the individual connection image in the area correlated to the individual area.

The image generating unit may generate an image containing the connection information and area information representing the individual area correlated to the individual connection image as the individual connection image, and the information generating unit may generate information representing the connection request and the individual area based on the connection information and the area information contained in the imaging information as the connection request information.

Accordingly, the display system or the like may determine for which individual area the display request is because the connection request information contains the information representing the individual area.

Further, the image generating unit may generate the received image according to the image information from the image supply device as the transmission source of the connection request information in the individual area based on information representing the individual area contained in the connection request information.

Accordingly, the display system or the like may display the received image based on the image information from the image supply device as the transmission source in the individual area according to the request.

Further, the system or the like may include an updating unit that updates area management data representing whether the individual area is in use or not, and the determining unit may permit connection to the image supply device as the transmission source of the connection request information when the individual area indicated by the connection request information is not in use and refuse connection to the image supply device when the individual area is in use based on the connection request information and the area management data.

Accordingly, the display system or the like may properly control display using the area management data even when images are displayed in plural individual areas.

Further, the segmented image may contain a plurality of the individual connection images correlated to different individual areas, respectively, the image generating unit may generate an image showing a desired individual connection image of the plurality of the individual connection images in a different display format from those of the other individual connection images as the segmented image, the image supply device may include an identifying unit that identifies the desired individual connection image based on the imaging information to identify the connection information represented by the individual connection image, and the information generating unit may generate the connection request information based on the connection information identified by the identifying unit.

Accordingly, the display system or the like may display the image in the desired individual area by identifying the desired connection information even when plural individual connection images are contained in the taken image by displaying the plural individual connection images.

Further, the segmented image may contain a plurality of the individual connection images correlated to different individual areas, respectively, the image supply device may include an identifying unit that identifies an individual connection image onto which pointing light is projected by the pointing light projecting unit based on the imaging information to identify the connection information represented by the individual connection image, and the information generating unit may generate the connection request information based on the connection information identified by the identifying unit.

Accordingly, the display system or the like may display the image in the desired individual area by identifying the desired connection information even when plural individual connection images are contained in the taken image by displaying the plural individual connection images. Especially, in this case, the user may point his or her desired individual area with the pointing light.

Further, the image information may contain resolution information representing resolution of the image and contents information representing contents of the image, and the image generating unit may generate the received image adjusted to resolution adapted to the resolution of the individual area based on the resolution information and the contents information in the individual area.

Accordingly, the display system or the like may display the received image with proper resolution even when the resolution of the individual area and the resolution of the received image are different.

BRIEF DESCRIPTION OF THE DRAWINGS

Embodiments of the disclosure are described with reference to the accompanying drawings, wherein like numbers reference like elements.

DESCRIPTION OF EMBODIMENTS

In the following description, reference is made to the accompanying drawings which form a part hereof wherein like numerals designate like parts throughout, and in which are shown, by way of illustration, specific embodiments as applied to display systems in which various aspects of the disclosure may be practiced. It is to be understood that other embodiments may be utilized and structural or logical changes may be made without departing from the scope of the present disclosure. Therefore, the following description is not to be taken in a limiting sense, and the scope of the present disclosure is defined by the appended claims and their equivalents. Further, all of the configurations shown in the following embodiments are not necessarily essential solutions for the various aspects of the embodiments described in claims.

Throughout the specification and claims, the following terms take at least the meanings explicitly associated herein, unless the context clearly dictates otherwise. The meanings identified below are not intended to limit the terms, but merely provide illustrative examples for use of the terms. The meaning of "a," "an," and "the" may include reference to both the singular and the plural. Reference in the specification to "one embodiment" or "an embodiment" means that a particular feature, structure, or characteristic described in connection with the embodiment is included in at least one embodiment of the disclosure. The meaning of "in" may include "in" and "on." The appearances of the phrases "in one embodiment" or "in an embodiment" in various places in the specification do not necessarily all refer to the same embodiment, but it may.

Several embodiments will sequentially be described under corresponding section headings below. Section headings are merely employed to improve readability, and they are not to be construed to restrict or narrow the present disclosure. For example, the order of description headings should not necessarily be construed so as to imply that these operations are necessarily order dependent or to imply the relative importance of an embodiment. Moreover, the scope of a disclosure under one section heading should not be construed to restrict or to limit the disclosure to that particular embodiment, rather the disclosure should indicate that a particular feature, structure, or characteristic described in connection with a section heading is included in at least one embodiment of the disclosure, but it may also be used in connection with other embodiments.

First Embodiment

Figure 1:
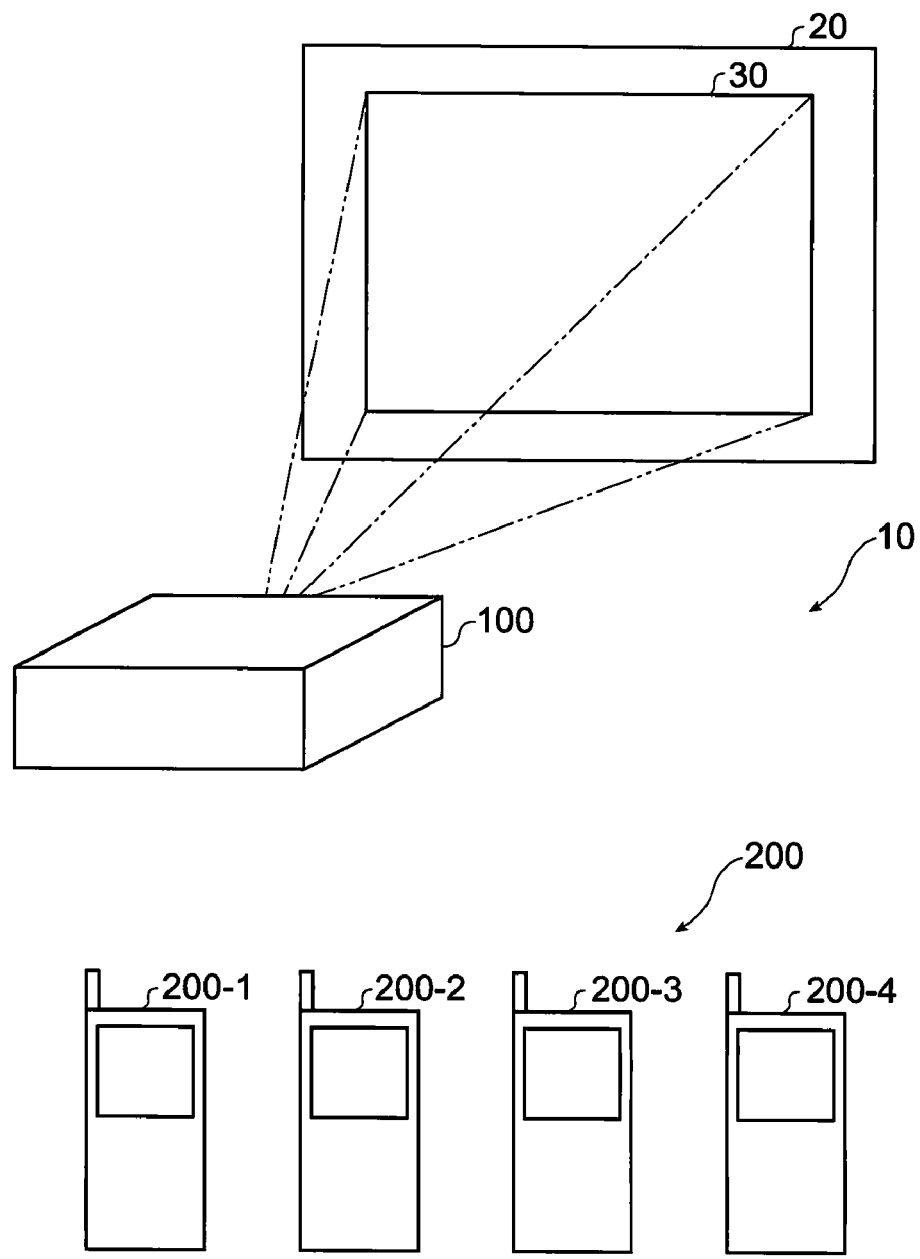
FIG. 1 is an overall view of a display system in the first embodiment.

FIG. 1 is an overall view of a display system 10 in the first embodiment. The display system 10 includes a projector 100 as a kind of display device and a cellular phone 200 as a kind of image supply device. The projector 100 may establish connection to plural cellular phones 200-1 to 200-4 via wireless communication channels (or wired communication channels), and projects an image 30 on a screen 20 based on image information from at least one cellular phone 200. For example, at a conference, four participants respectively use the cellular phones 200 to transmit image information to the projector 100 for projection of the image 30.

Figure 2:
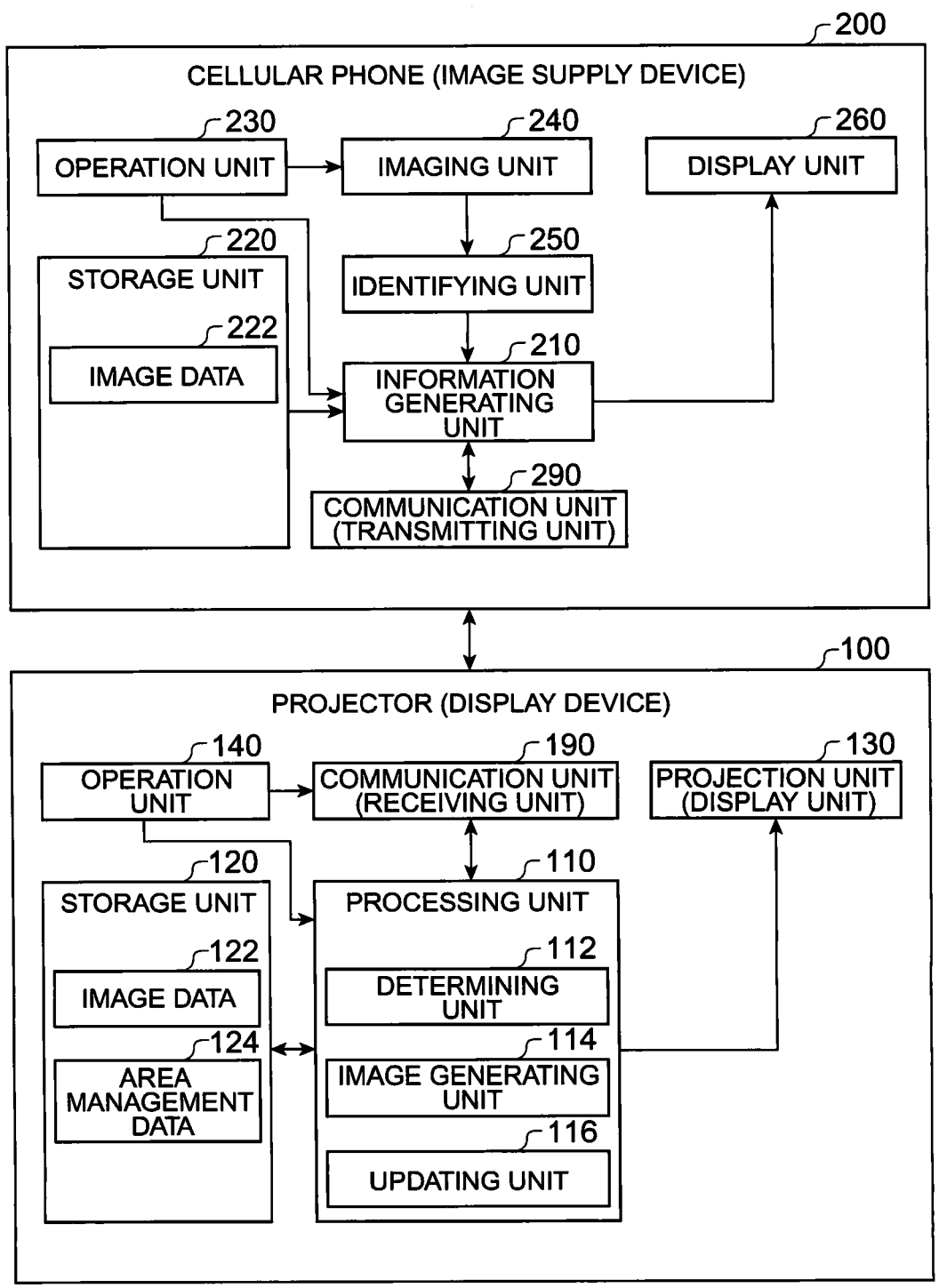
FIG. 2 is a functional block diagram of the display system in the first embodiment.

Next, functional blocks of the projector 100 and the cellular phone 200 forming the display system 10 is described. FIG. 2 is a functional block diagram of the display system 10 in the first embodiment.

The cellular phone 200 includes an imaging unit 240 that takes at least part of the image 30 projected onto the screen 20 and generates imaging information, an identifying unit 250 that identifies predetermined information contained in the imaging information, an information generating unit 210 that generates connection request information, image information, etc., a communication unit (transmitting unit) 290 that transmits and receives various kinds of information to and from the projector 100. Further, the cellular phone 200 includes a storage unit 220 that stores image data 222 to be displayed and the like, an operation unit 230, and a display unit 260.

Further, the projector 100 includes a processing unit 110 that executes various kinds of processing, a storage unit 120 that stores various kinds of data and programs, a projection unit (display unit) 130 that projects various images, an operation unit 140, and a communication unit (receiving unit) 190 that transmits and receives various kinds of information to and from the cellular phone 200.

The processing unit 110 includes a determining unit 112 that makes various determinations, an image generating unit 114 that generates various images, and an updating unit 116 that updates data within the storage unit 120. Further, the storage unit 120 stores image data 122 representing data of two-dimensional codes as a kind of connection information and the like, and area management data 124 for management of individual areas of a segmented image, which is described later.

As hardware for mounting the functions of the respective parts, for example, the following hardware may be adopted. For example, buttons or the like for the operation units 140, 230, wireless communication units or the like for the communication units 190, 290, a CPU, an image processing circuit or the like for the processing unit 110, the information generating unit 210, the identifying unit 250, RAMs or the like for the storage units 120, 220, a liquid crystal panel, lamp, lens, or the like for the projection unit 130, and a liquid crystal display for the display unit 260 may be adopted.

Figure 3:
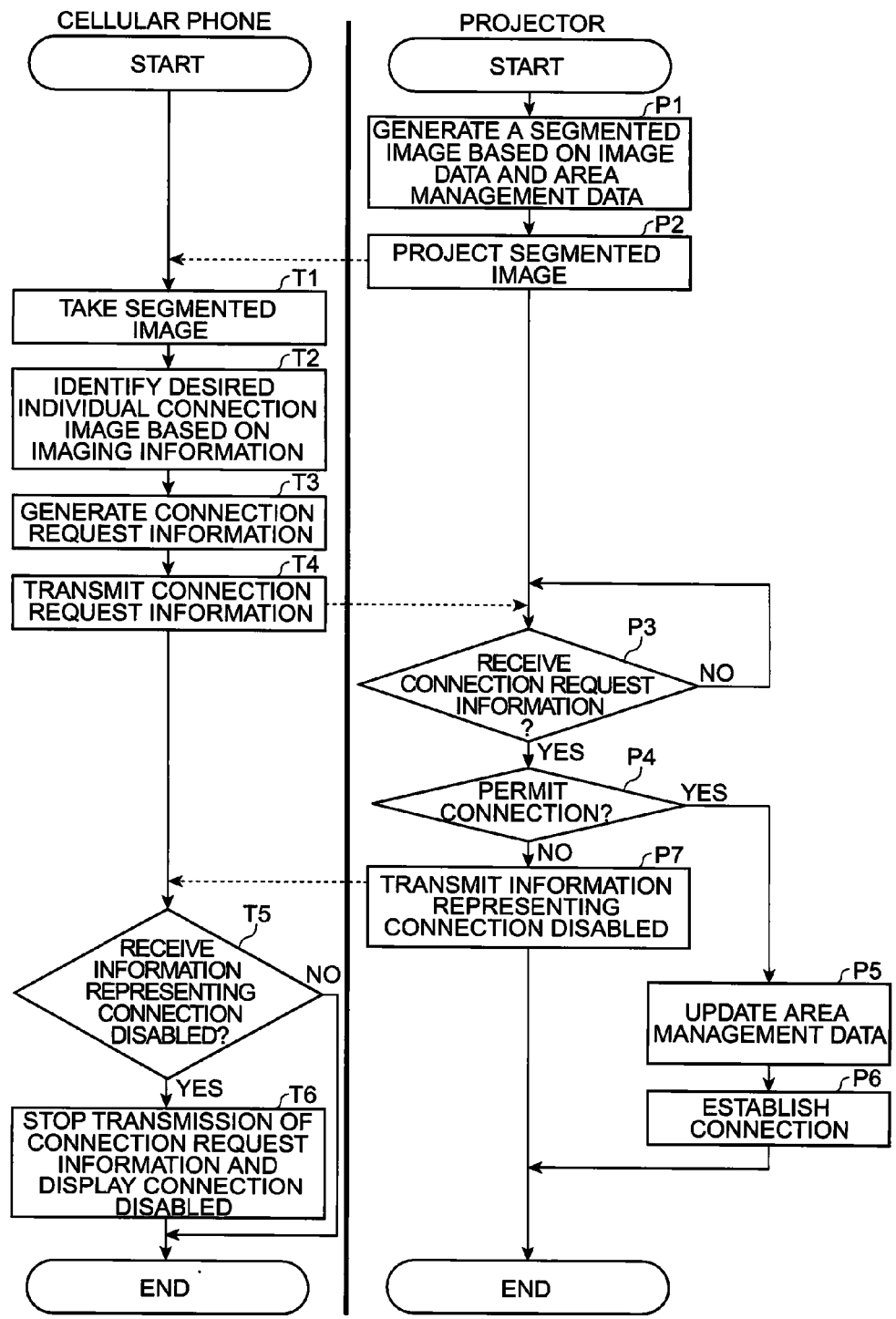
FIG. 3 is a flowchart showing a flow of processing when connection is made in the first embodiment.
Figure 6:
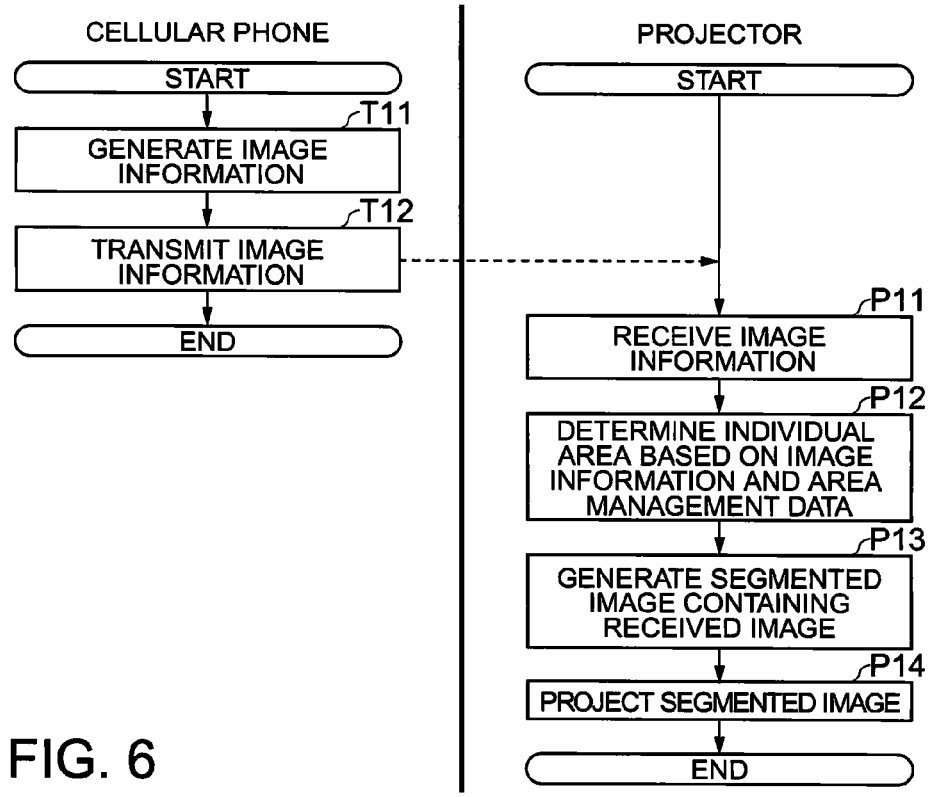
FIG. 6 is a flowchart showing a flow of processing when a received image is projected in the first embodiment.

Turning now to FIGS. 3 and 6, methods of the disclosure, in accordance with various embodiments, are described in terms of firmware, software, and/or hardware with reference to flowcharts and/or flow diagrams. Describing a method by reference to a flowchart enables one skilled in the art to develop programs, including instructions to carry out the methods on suitably configured computer systems and electronic devices. In various embodiments, portions of the operations to be performed by an electronic device or computer system may constitute circuits, general purpose processors (e.g., micro-processors, micro-controllers, an ASIC, or digital signal processors (DSPs)), special purpose processors (e.g., application specific integrated circuits or ASICS), firmware (e.g., firmware that is used by a processor such as a micro-processor, a micro-controller, and/or a digital signal processor), state machines, hardware arrays, reconfigurable hardware, and/or software made up of executable instructions. The executable instructions may be embodied in firmware logic, reconfigurable logic, a hardware description language, a state machine, an application-specific integrated circuit (ASIC), or combinations thereof.

With respect to various embodiments using a software implementation (e.g., a hardware simulator), at least one of the processors of a suitably configured electronic communication device, such as a mobile phone, executes the instructions from a storage medium. The computer-executable instructions may be written in a computer programming language or executable code. If written in a programming language conforming to a recognized standard, such instructions may be executed on a variety of hardware platforms and may interface with a variety of operating systems. Although the various embodiments are not described with reference to any particular programming language, it will be appreciated that a variety of programming languages may be used to implement the teachings of the embodiments as described herein. Furthermore, it is common in the art to speak of software in one form or another (e.g., program, procedure, process, application, etc.) as taking an action or causing a result. Such expressions are merely a shorthand way of saying that execution of the software by a device causes the processor of the computer to perform an action or a produce a result.

Next, a flow of processing when connection is made using the respective parts is described. FIG. 3 is a flowchart showing a flow of processing when connection is made in the first embodiment. The image generating unit 114 generates a segmented image segmented into plural individual areas based on the image data 122 and the area management data 124 according to operation information from the operation unit 140 based on the display instruction of the user (step P1), and the projection unit 130 projects the segmented image (step P2).

Figure 4:
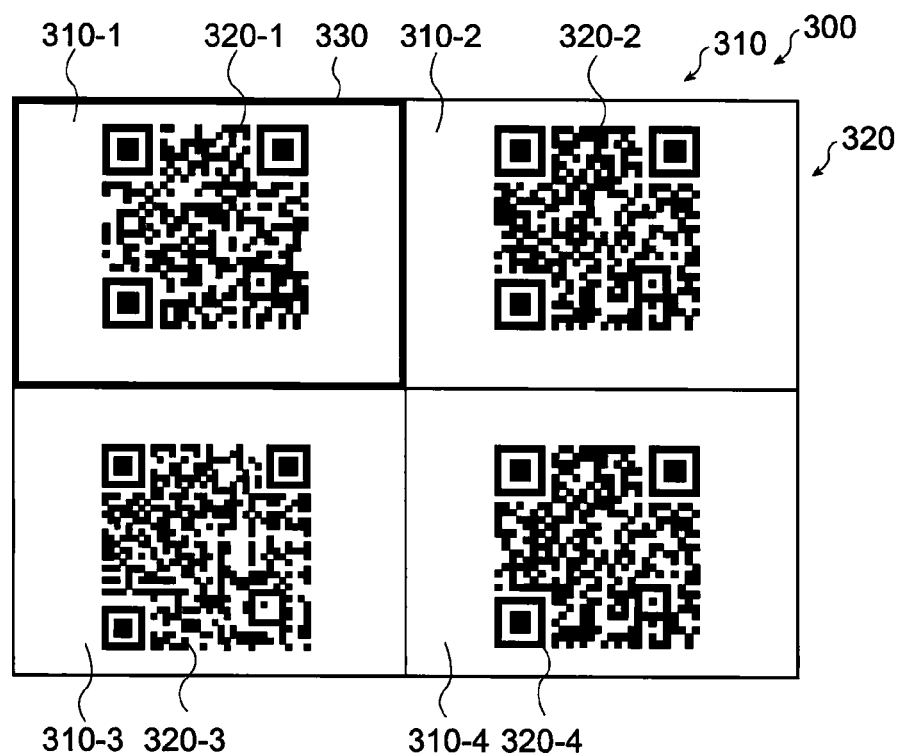
FIG. 4 shows an example of a segmented image containing individual connection images in the first embodiment.

FIG. 4 shows an example of a segmented image 300 containing individual connection images 320 in the first embodiment. The segmented image 300 includes four individual areas 310-1 to 310-4. In each individual area 310, the individual connection image 320 is displayed. The individual connection image 320 is formed by two-dimensionally coding connection information for the cellular phone 200 to connect to the projector 100 (e.g., information representing connection destination such as IP address, authentication information such as pass word, etc.) and area information representing the individual area 310 correlated to the individual connection image 320. The two-dimensionally coded image is stored in the storage unit 120 as part of the image data 122.

Further, the segmented image 300 contains a frame image 330 for indicating a desired individual connection image 320. For example, in the example shown in FIG. 4, the upper left individual connection image 320-1 is surrounded with a thick black frame by the frame image 330.

A user of one cellular phone 200 takes an image of the area including at least one individual area 310 of the segmented image 300 projected on the screen 20 by operating the operation unit 230 (step T1). Specifically, the imaging unit 240 takes an image according to the imaging instruction information from the operation unit 230 and generates imaging information.

Figure 5:
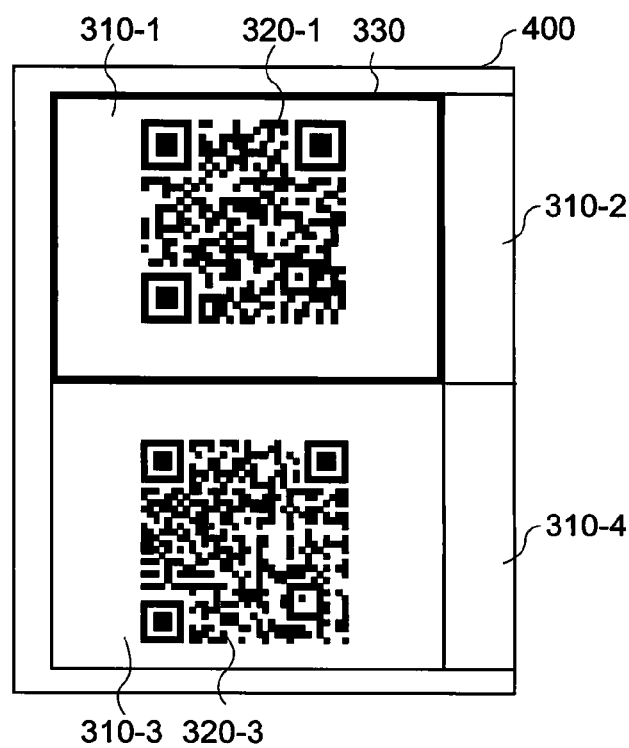
FIG. 5 shows an example of a taken image in the first embodiment.

FIG. 5 shows an example of a taken image 400 in the first embodiment. For example, the taken image 400 shown in FIG. 5 includes the entire individual areas 310-1 and 310-3 and part of individual areas 310-2 and 310-4.

The identifying unit 250 identifies the desired individual connection image 320-1 based on the imaging information from the imaging unit 240 (step T2). For example, in the example shown in FIG. 5, the identifying unit 250 detects the black frame of the frame image 330 using a technique of edge detection or the like and identifies the individual connection image 320-1 within the black frame.

The information generating unit 210 generates connection request information based on the identification information (information representing the individual connection image 320-1) from the identifying unit 250 (step T3). Specifically, for example, the information generating unit 210 converts the two-dimensionally coded individual connection image 320-1 into original connection information and area information using a general conversion algorithm, and generates connection information representing the projector 100 as connection destination, area information representing display target area, and connection request information containing information representing the cellular phone 200 as a transmission source.

The communication unit 290 transmits the connection request information from the information generating unit 210 toward the projector 100 (step T4). The communication unit 190 determines whether the connection request information is received or not (step P3).

The determining unit 112 determines whether connection is permitted or not based on the connection request information and the area management data 124 if the connection request information is received (step P4). The area management data 124 is data representing whether each individual area 310-1 to 310-4 is assigned to anyone of cellular phones 200 or not (in use or not). For example, in the initial state, none of the individual areas 310 is assigned to any one of cellular phones 200, and the connection is permitted.

If connection is permitted, the updating unit 116 updates the area management data 124 based on the connection request information (step P5). For example, if the area information contained in the connection request information indicates the individual area 310-1 and the information representing the cellular phone 200 as the transmission source indicates the cellular phone 200-1, the updating unit 116 updates the area management data 124 to represent that the individual area 310-1 in the area management data 124 is assigned to the cellular phone 200-1 (the IP address of the cellular phone 200 or the like may be used). Then, the communication unit 190 establishes connection to the cellular phone 200 as the transmission source based on the information indicating the cellular phone 200 as the transmission source contained in the connection request information (step P6).

On the other hand, if connection is not permitted, the communication unit 190 transmits information representing that connection is disabled to the cellular phone 200 as the transmission source of the connection request information (step P7). The communication unit 290 determines whether the information is received or not (step T5), and stops the transmission of the connection request information if the information is received. Further, in this regard, the information generating unit 210 generates image information based on the information received by the communication unit 290, and the display unit 260 displays an image showing a character string such as "connection is disabled during use by other cellular phones" based on the image information (step T6).

The projector 100 and the cellular phone 200 establish connection of the individual areas 310 by repeating the above described procedure. In this regard, if the determination that there is an individual area 310 having no connection is made based on the area management data 124, the image generating unit 114 generates the segmented image 300 in which the frame image 330 is moved to the individual area 310 having no connection.

Next, a flow of processing when a received image is projected will be described. FIG. 6 is a flowchart showing a flow of processing when a received image is projected in the first embodiment.

The information generating unit 210 of the cellular phone 200 that has established connection to the projector 100 generates image information based on the connection information and the image data 222 (step T11). The image data 222 may be still image data or moving image data.

The communication unit 290 transmits the image information from the information generating unit 210 toward the projector 100 (step T12). The image information includes contents information representing contents of image, transmission destination information, and transmission source information, for example.

The communication unit 190 receives the image information from the cellular phone 200 (step P11). The determining unit 112 determines that the cellular phone 200 as the transmission source of the image information is a proper cellular phone 200 based on the image information and the area management data 124, and determines the individual area 310 assigned to the cellular phone 200 (step P12).

The image generating unit 114 generates a segmented image indicating the received image based on the contents information from the cellular phone 200 in the determined individual area 310 (step P13), and the projection unit 130 projects the segmented image (step P14).

Figure 7:
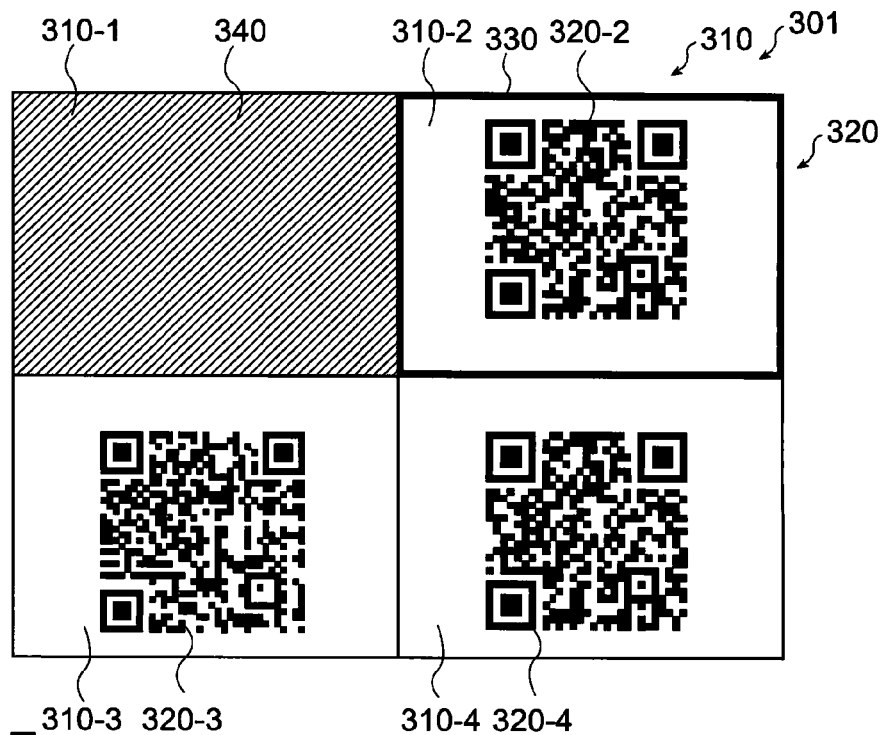
FIG. 7 shows an example of the segmented image containing the received image in the first embodiment.

FIG. 7 shows an example of a segmented image 301 containing a received image 340 in the first embodiment. For example, as shown in FIG. 7, the individual area 310-1 is assigned to the cellular phone 200-1 that has established connection, the received image 340 based on the image information from the cellular phone 200-1 is displayed in the individual area 310-1. The projector 100 and the cellular phone 200 may display the received image 340 in all of the four individual areas 310 by repeating the above procedure.

As described above, according to the embodiment, the display system 10 may generate connection request information by imaging the individual connection image 320, and easily make connection with ensured security by transmitting and receiving the connection request information. Further, according to the embodiment, the display system 10 may clearly present in which area the image is displayed by displaying the individual connection image 320 within the individual area 310.

Further, according to the embodiment, the display system 10 may display the received image 340 in each individual area 310 by correlating each individual area 310 to each cellular phone 200. Further, according to the embodiment, the display system 10 may appropriately control display even when images are displayed in plural individual areas 310 using the area management data 124.

Furthermore, according to the embodiment, the display system 10 may display the image in the desired individual area 310 by identifying desired connection information even when the taken image 400 contains plural individual connection images 320 in display of the plural individual connection images 320. For example, a conceivable method is to display a frame image on the screen of the cellular phone 200 and take one individual connection image 320 within the frame, however, such a method needs much time and effort for adjustment of position, direction, zoom of camera, or the like. On the other hand, according to the method of the embodiment, the taken image 400 containing plural individual connection images 320 may be used for reducing the time and effort of the user.

Second Embodiment

Figure 8:
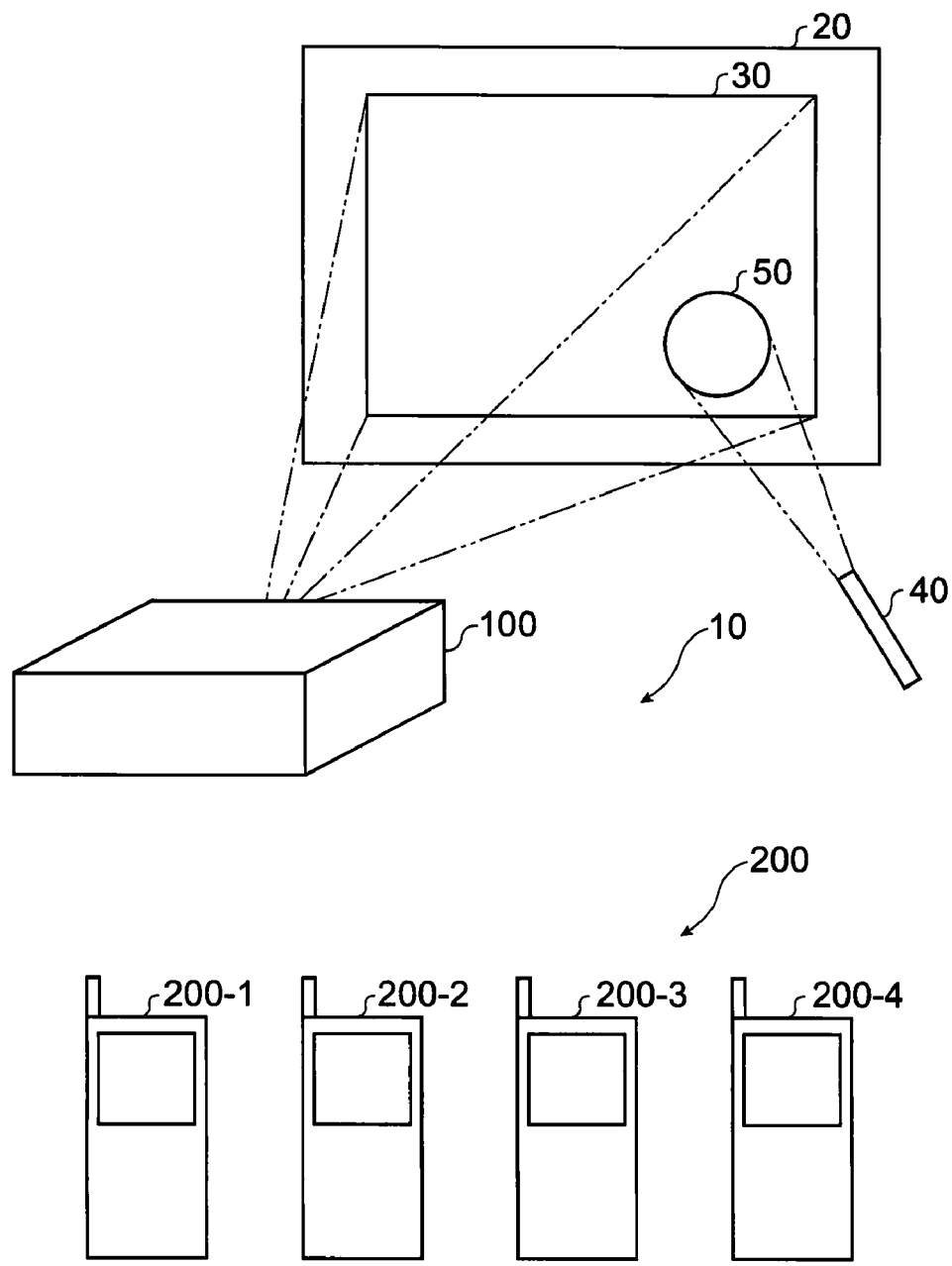
FIG. 8 is an overall view of a display system in the second embodiment.

Next, an embodiment of pointing a desired individual area 310 using pointing light is described. FIG. 8 is an overall view of a display system in the second embodiment. A user may project pointing light 50 on the screen 20 using a laser pointer 40 as a kind of pointing light projecting unit.

Figure 9:
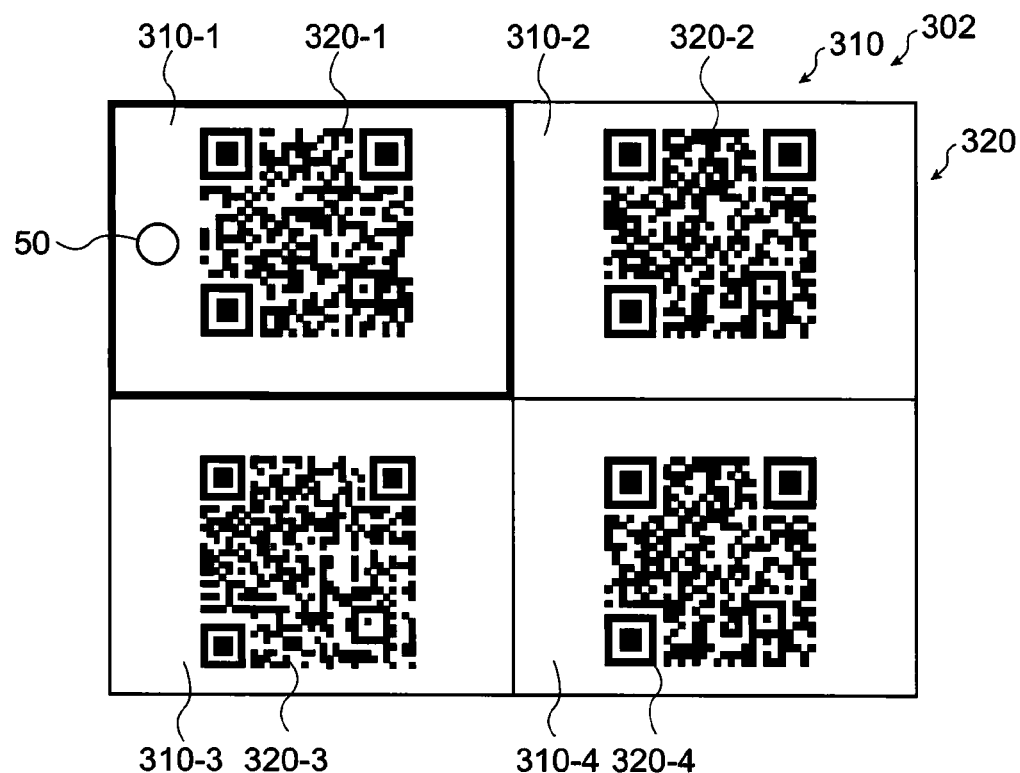
FIG. 9 shows an example of a segmented image containing individual connection images in the second embodiment.

FIG. 9 shows an example of a segmented image 302 containing individual connection images 320 in the second embodiment. For example, in the example shown in FIG. 9, in the segmented image 302 projected on the screen 20, the pointing light 50 is projected within the individual area 310-1 by the laser pointer 40.

Figure 10:
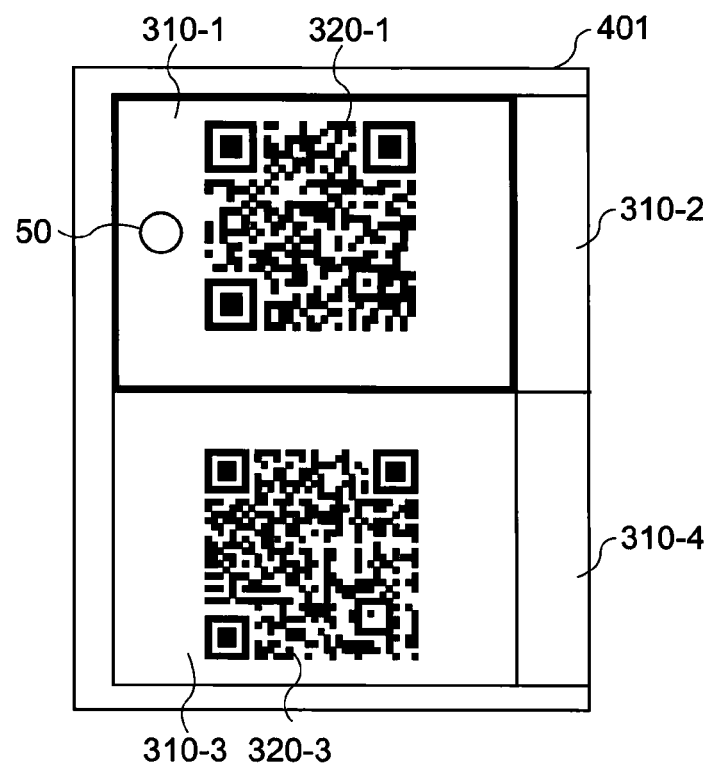
FIG. 10 shows an example of a taken image in the second embodiment.

FIG. 10 shows an example of a taken image 401 in the second embodiment. In this case, the pointing light 50 is contained within the individual area 310-1 in the taken image 401. Generally, the brightness value of the pointing light 50 is higher than the brightness value of the segmented image 302. Accordingly, the identifying unit 250 may identify the pointing light 50 by identifying the brightness distribution of the taken image 401 and detecting the high-brightness area. Furthermore, the identifying unit 250 identifies the individual connection image 320 closest to the pointing light 50 within the taken image 401 as a desired individual connection image 320. Through the above procedure, regarding the individual connection image 320, the desired individual connection image 320 may be identified as is the case of the first embodiment.

Thereby, the display system 10 exerts the same effect as that of the first embodiment even when the method of the second embodiment is used. Furthermore, according to the embodiment, the display system 10 may display a received image 340 in the individual area 310 desired by the user using the pointing light 50.

Especially, according to the embodiment, when plural users use the projector 100 and plural cellular phones 200 to have a conference or the like, the user may point his or her desired individual area 310 in a visually apparent manner for other users and display a received image 340, and thus, the individual area 310 is used with no competition with the other users and the conference or the like may be held with efficiency.

Third Embodiment

Although the individual connection images 320 are displayed within the individual areas 310 in the first and second embodiments, the individual connection images 320 may be displayed outside of the individual areas 310 as long as the correspondences between the individual areas 310 and the individual connection images 320 are known.

Figure 11:
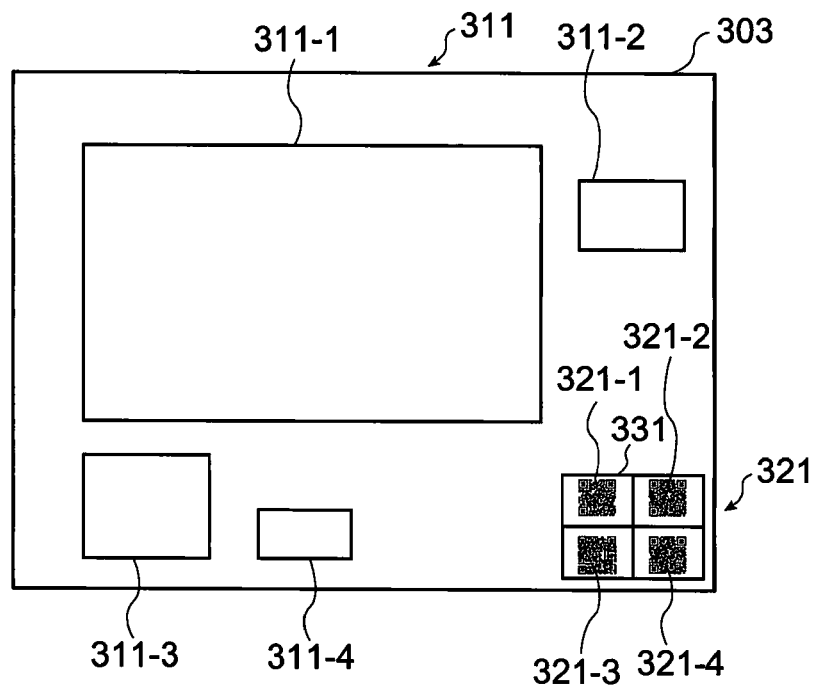
FIG. 11 shows an example of a segmented image containing individual connection images in the third embodiment.

FIG. 11 shows an example of a segmented image 303 containing individual connection images 321 in the third embodiment. In the example shown in FIG. 11, four individual areas 311-1 to 311-4 in different sizes are located at the upper left, upper right, lower left, and lower right of the segmented image 303, four individual connection images 321-1 to 321-4 are located at the upper left, upper right, lower left, and lower right of the lower right part of the segmented image 303, and a frame image 331 is located on the individual connection image 321-1. The individual connection images 321-1 to 321-4 show area information of the individual areas 311-1 to 311-4, respectively.

In this case, a user may obtain a taken image 400 by taking an image of the lower right part of the segmented image 303 using a cellular phone 200. Further, connection request information transmitted from the cellular phone 200 shows area information of one of the individual areas 311-1 to 311-4, and thus, the projector 100 may determine for which area the connection request is.

As described above, the display system 10 also exerts the same effect as that of the first embodiment using the method of the third embodiment. Especially, according to the embodiment, since the image displayed in the individual area 311 may be updated with the individual connection image 321 being displayed, the segmented image 303 may be updated more efficiently.

Other Embodiments

The application of the disclosure is not limited to the above described embodiments, but various changes may be made. For example, the image information transmitted by the cellular phone 200 to the projector 100 may include resolution information representing resolution of image. Accordingly, as shown in FIG. 11, even when the sizes of the individual areas 311 are not equal, the image generating unit 114 adjusts contents information based on the resolution information according to the resolution of the individual areas 311, and thereby, the received image 340 may be displayed with proper resolution.

Further, the connection information contained in the individual connection image 320 may include information representing resolution of the individual area 310, and the information generating unit 210 may adjust resolution of the image data 222 based on the information representing resolution identified by the identifying unit 250 and generate image information. Accordingly, the projector 100 may display the received image 340 with proper resolution without adjustment of the image information.

Further, the individual connection image 320 is not limited to a two-dimensional barcode, but various types of information of image, character string, or the like that may be converted into connection information may be adopted. Further, the image data 122 for generating the individual connection image 320 may be dynamically generated by the image generating unit 114.

Further, the method of pointing the desired individual connection image 320 is not limited to the method using the frame image 330 or the method using a laser beam, but a method of displaying a desired individual connection image 320 in different color, brightness, or shape from those of the other individual connection images 320, a method of pointing with infrared light, and the like may be adopted. Further, when the taken image 400 contains plural individual connection images 320, a method of selecting a desired individual connection image 320 in the taken image 400 may be adopted.

The correspondence between the individual area 310 and the cellular phone 200 may be 1:1, or plural individual areas 310 may be assigned to one cellular phone 200. Further, the number of individual areas 310 is not limited to four, but may be one to three or five or more. The number of display devices is not limited to one. For example, the disclosure may be applied even to the case where two projectors 100 project in parallel. Further, the number of image supply devices is not limited to four, but may be one to three or five or more.

The image supply device is not limited to the cellular phone 200, but various devices that may output image information such as PC, portable terminal, DVD player, set-top box, game device, digital camera, or digital video camera, for example may be adopted. Further, the display device is not limited to the projector 100, but various devices which may be configured to display images such as television, liquid crystal monitor, cellular phone, for example may be adopted.

Further, the projector 100 is not limited to a liquid crystal projector, but a projector using DMD (Digital Micromirror Device) may be used. The DMD is a registered trademark of Texas Instruments, Inc., U.S. The function of the projector 100 may be distributed and mounted in plural devices (e.g., PC and projector, or the like).

Further, although the user takes and points images in the above described embodiments, images may be automatically taken and pointed. For example, a digital camera may take an image of the screen 20 at regular time intervals, or the pointing light projecting unit for projecting pointing light may change the position of the pointing light 50 on the screen 20 at regular time intervals by changing the projection direction at regular time intervals. Further, the image supply device may incorporate the pointing light projecting unit. Furthermore, the function of the image supply device may be distributed and mounted in plural devices (e.g., PC and digital camera, or the like), and the function of the display device may also be distributed and mounted in plural devices (e.g., PC and liquid crystal monitor, or the like).

What is claimed is:

1. A display system comprising:
    at least one image supply device configured to transmit image information via a network, each image supply device including:
        an imaging unit configured to take an image of an area including an individual display area in a divided display image and to generate imaging information, and
        an information generating unit configured to generate connection request information representing a connection request based on connection information contained in the imaging information, and
        a transmitting unit configured to transmit the connection request information and the image information; and
    a display device including:
        an image generating unit configured to generate a divided display image that is divided into plural individual display areas, each of the plural individual display areas being configured to display either an individual connection image or a received image that is based on the image information transmitted from the at least one image supply device via the network;
        a display unit configured to display the divided display image;
        a receiving unit configured to receive the image information and connection request information from the at least one image supply device; and
        a determining unit configured to determine whether connection is permitted or not based on the connection request information,
    wherein:
        each individual connection image includes:
            coded connection information for the at least one image supply device to connect to the display device, and
            coded area information identifying the corresponding individual display area of the divided display image,
        prior to the receiving unit receiving the image information and the connection request information from the at least one image supply device, the connection request information includes connection information and area information based on the coded connection information and the coded area information included in a first individual connection image located in a first individual display area of the plural individual display areas, the area information included in the connection request information identifying the first individual display area, and
        after connection to the at least one image supply device as a transmission source of the connection request information is permitted by the determining unit, the image generating unit generates the divided display image containing the received image based on the image information from the at least one image supply device, the received image being displayed in the first individual display area identified by the area information received from the at least one image supply device.

2. The display system according to claim 1, wherein the image generating unit generates an image containing the coded connection information and the coded area information identifying the first individual display area as the first individual connection image, and the information generating unit generates information representing the connection request and the first individual display area based on the coded connection information and the coded area information contained in the imaging information as the connection request information.

3. The display system according to claim 2, wherein the image generating unit generates the received image according to the image information from the image supply device as the transmission source of the connection request information in the first individual display area based on information identifying the first individual display area contained in the connection request information.

4. The display system according to claim 2, further comprising an updating unit configured to update area management data representing whether the first individual display area is in use or not, wherein the determining unit permits connection to the at least one image supply device as the transmission source of the connection request information when the first individual display area indicated by the connection request information is not in use and refuses connection to the at least one image supply device when the first individual display area is in use based on the connection request information and the area management data.

5. The display system according to claim 1, wherein the divided display image contains a plurality of the individual connection images correlated to different individual display areas, respectively, the image generating unit generates an image showing a desired individual connection image of the plurality of the individual connection images in a different display format from those of the other individual connection images as the divided display image, the at least one image supply device includes an identifying unit configured to identify the desired individual connection image based on the imaging information to identify the coded connection information and the coded area information included in the desired individual connection image, and the information generating unit generates the connection request information based on the coded connection information and the coded area information identified by the identifying unit.

6. The display system according to claim 1, wherein the divided display image contains a plurality of the individual connection images correlated to different individual display areas, respectively, the image supply device includes an identifying unit configured to identify an individual connection image onto which pointing light is projected by the pointing light projecting unit based on the imaging information to identify the coded connection information and the coded area information included in the individual connection image, and the information generating unit generates the connection request information based on the coded connection information and the coded area information identified by the identifying unit.

7. The display system according to claim 1, wherein the image information contains resolution information representing resolution of the image and contents information representing contents of the image, and the image generating unit generates the received image adjusted to resolution adapted to the resolution of the first individual display area based on the resolution information and the contents information in the first individual display area.

8. A display device configured to display a received image based on image information transmitted from at least one image supply device having a communication function and an imaging function via a network, the display device comprising:

an image generating unit configured to generate a divided display image that is divided into plural individual display areas, each of the plural individual display areas being configured to display either an individual connection image or a received image that is based on image information transmitted from at least one image supply device via the network, each individual connection image including:
coded connection information for the at least one image supply device to take an image of and to connect to the display device, and
coded area information identifying the corresponding individual display area of the divided display image;
a display unit configured to display the divided display image;
a receiving unit configured to receive the image information and connection request information from the at least one image supply device; and
a determining unit configured to determine whether connection is permitted or not based on the connection request information,
wherein:
prior to the receiving unit receiving the image information and the connection request information from the at least one image supply device, the connection request information includes connection information and area information based on the coded connection information and the coded area information included in a first individual connection image located in a first individual display area of the plural individual display areas, the area information included in the connection request information identifying the first individual display area, and
after connection to the at least one image supply device as a transmission source of the connection request information is permitted by the determining unit, the image generating unit generates the divided display image containing the received image based on the image information from the at least one image supply device, the received image being displayed in the first individual display area identified by the area information received from the at least one image supply device.

9. The display device according to claim 8, wherein the image generating unit generates an image containing the coded connection information and the coded area information identifying the first individual display area as the first individual connection image.

10. The display device according to claim 9, wherein the image generating unit generates the received image according to the image information from the at least one image supply device as the transmission source of the connection request information in the first individual display area based on information identifying the first individual display area contained in the connection request information generated based on the coded connection information and the coded area information contained in the imaging information by the at least one image supply device.

11. The display device according to claim 9, further comprising an updating unit configured to update area management data representing whether the first individual display area is in use or not, wherein the determining unit permits connection to the at least one image supply device as the transmission source of the connection request information when the first individual display area indicated by the connection request information is not in use and refuses connection to the at least one image supply device when the first individual display area is in use based on the connection request information and the area management data.

12. The display device according to claim 8, wherein the divided display image contains a plurality of the individual connection images correlated to different individual display areas, respectively, and the image generating unit generates an image showing a desired individual connection image of the plurality of the individual connection images in a different display format from those of the other individual connection images as the segmented divided display image.

13. The display device according to claim 8, wherein the image information contains resolution information representing resolution of the image and contents information representing contents of the image, and the image generating unit generates the received image adjusted to resolution adapted to the resolution of the first individual display area based on the resolution information and the contents information in the first individual display area.

14. A display method, comprising:
displaying a divided display image that is divided into plural individual display areas on a display device, each of the plural individual display areas being configured to display either an individual connection image or a received image that is based on image information transmitted from at least one image supply device via the network, each individual connection image including:
coded connection information to connect at least one image supply device to the display device, and
coded area information identifying the corresponding individual display area of the divided display image,
imaging an area using at least one image supply device, the area including an individual display area of the divided display image;
generating image information using the at least one image supply device;
generating connection request information representing a connection request toward the display device using the at least one image supply device based on the connection information contained in the imaging information;
transmitting the connection request information using the at least one image supply device via a network to the display device;
receiving the connection request information at the display device via the network and establishing connection to the at least one image supply device as a transmission source of the connection request information;
determining whether connection is permitted or not based on the connection request information;
receiving, after connection is permitted, the image information via the network and displaying the divided display image containing the received image using the display device based on the image information, the received image being displayed in a first individual display area of the plural individual display areas, the first individual display area being identified by the area information,
wherein prior to receiving the image information and the connection request information from the at least one image supply device, the connection request information includes connection information and area information based on the coded connection information and the coded area information included in a first individual connection image located in the first individual display area, the area information included in the connection request information identifying the first individual display area.

15. The display method according to claim 14, wherein the receiving using the display device includes a communication module configured to receive the image information from the at least one image supply device via the network and the displaying using the display device includes an image display module configured to display the received image based on image information transmitted from the at least one image supply device via the network.

16. The display method according to claim 14, wherein the imaging includes an imaging module configured to generate image information based on an optical scan and the transmitting using the at least one imaging supply device includes a communication module configured to transmit the image information from the at least one image supply device via the network.

17. The display method according to claim 14, wherein at least one of the at least one imaging supply device is a mobile phone.

18. The display system according to claim 1, wherein the individual connection image comprises a barcode that encodes the coded connection information and the coded area information.

19. A display system comprising:
at least one image supply device configured to transmit image information via a network, each image supply device including:
an imaging unit configured to take an image of an area including an individual connection image correlated to an individual display area in a divided display image and to generate imaging information, and
an information generating unit configured to generate connection request information representing a connection request based on connection information contained in the imaging information, and
a transmitting unit configured to transmit the connection request information and the image information; and
a display device including:
an image generating unit configured to:
generate a divided display image that is divided into plural individual display areas, each of the plural individual display areas being configured to display a received image that is based on the image information transmitted from the at least one image supply device via the network, and
generate a plurality of individual connection images corresponding to the plural individual display areas;
a display unit configured to display the divided display image and the plurality of individual connection images, the divided display image and the plurality of individual connection images being displayed in separate locations;
a receiving unit configured to receive the image information and connection request information from the at least one image supply device; and
a determining unit configured to determine whether connection is permitted or not based on the connection request information,
wherein:
each individual connection image includes:
coded connection information for the at least one image supply device to connect to the display device, and
coded area information identifying the corresponding individual display area of the divided display image,
prior to the receiving unit receiving the image information and the connection request information from the at least one image supply device, the connection request information includes connection information and area information based on the coded connection information and the coded area information included in a first individual connection image corresponding to a first individual display area of the plural individual display areas, the area information included in the connection request information identifying the first individual display area, and
after connection to the at least one image supply device as a transmission source of the connection request information is permitted by the determining unit, the image generating unit generates the divided display image containing the received image based on the image information from the at least one image supply device, the received image being displayed in the first individual display area identified by the area information received from the at least one image supply device.

* * * * *